F. KEELIN.
DIRIGIBLE LAMP.
APPLICATION FILED OCT. 28, 1915.
1,167,761.
Patented Jan. 11, 1916.
2 SHEETS—SHEET 1.
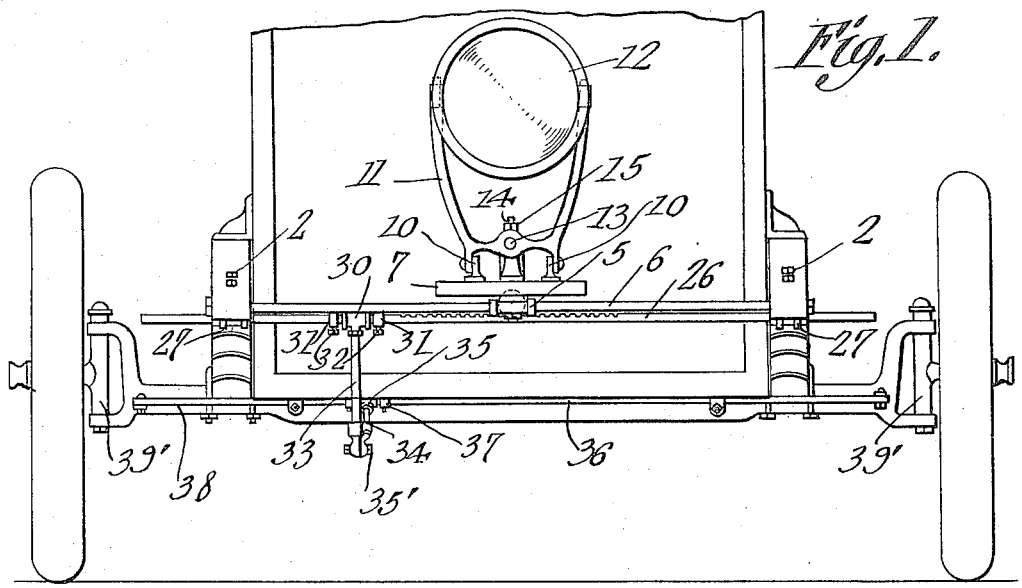
Fig. 1.
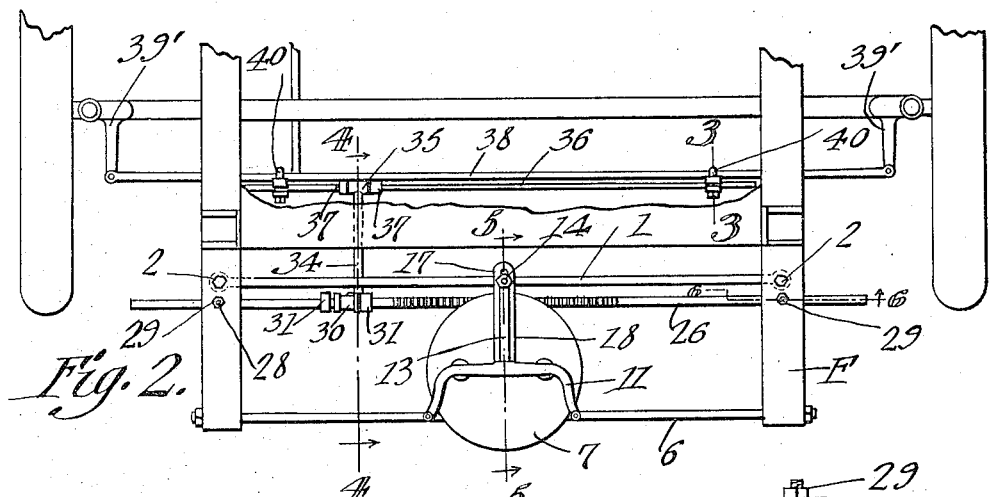
Fig. 2.
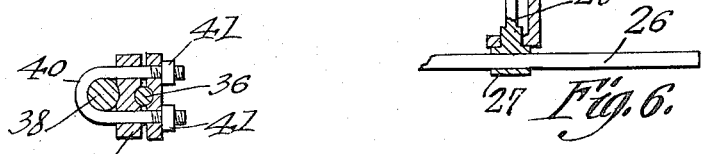
Fig. 3.
Fig. 6.
Witnesses
F. Keelin
Inventor
by
Attorneys

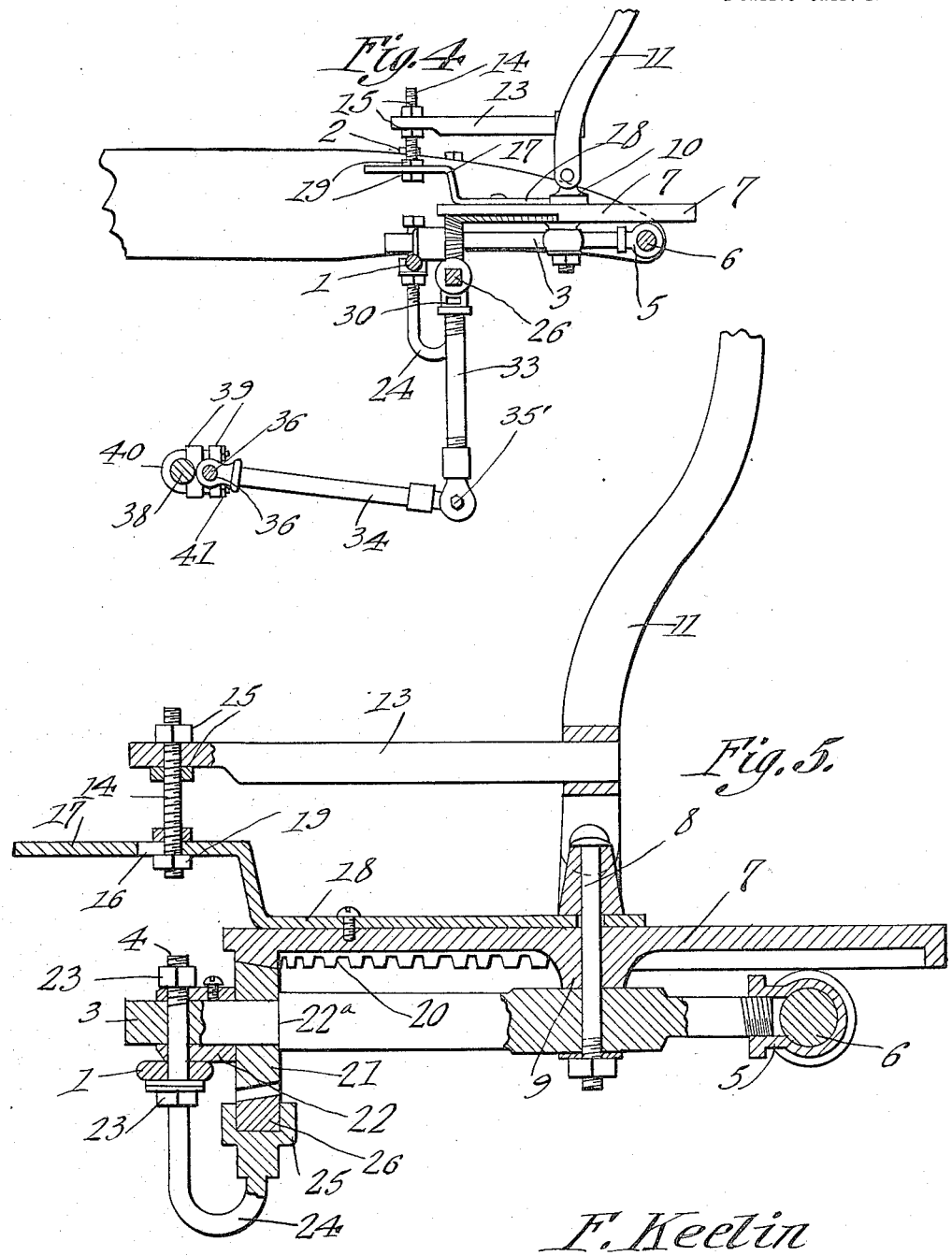

UNITED STATES PATENT OFFICE.

FRANK KEELIN, OF OXLEY, WEST VIRGINIA.

DIRIGIBLE LAMP.

1,167,761.  Specification of Letters Patent.  Patented Jan. 11, 1916.

Application filed October 28, 1915. Serial No. 58,427.

*To all whom it may concern:*

Be it known that I, FRANK KEELIN, a citizen of the United States, residing at Oxley, in the county of Raleigh and State of West Virginia, have invented a new and useful Dirigible Lamp, of which the following is a specification.

The present invention relates to dirigible lamps or headlights, and aims to provide novel and improved means for applying a lamp or headlight to an automobile and for operatively connecting it with the steering gear, so that the lamp will be angled to correspond with the steering wheels, whereby the light is continually thrown in the path to be traversed by the machine, even when rounding corners or curves.

The invention embodies a novel assemblage of the component elements, whereby the device can be readily attached to the respective parts of a motor vehicle, and in order that the device will operate in a practical and effective manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a front view of the device as applied to a motor vehicle. Fig. 2 is a plan view, portions being broken away. Fig. 3 is an enlarged sectional detail taken on the line 3—3 of Fig. 2 illustrating one of the clamps. Figs. 4 and 5 are enlarged sections taken on the lines 4—4 and 5—5, respectively, of Fig. 2. Fig. 6 is an enlarged sectional detail taken on the line 6—6 of Fig. 2 illustrating one of the guides for the rack bar.

In carrying out the invention, a transverse supporting rod or bar 1 has its ends bolted, as at 2, to the side members or channels of the frame or chassis F of the motor vehicle adjacent the forward end of said frame, and a longitudinal yoke 3 has its rear end secured upon the intermediate portion of the rod 1 by means of a bolt 4 engaged through the rod 1 and yoke 3. The forward end of the yoke 3 is received by the branch or arm of a T-coupling 5 mounted upon the transverse tie rod 6 connecting the forward ends of the side or channel members of the frame F. The yoke 3 supports a horizontal wheel or disk 7 disposed thereabove, said wheel being pivotally or rotatably mounted upon the yoke 3 by means of a spindle 8, and the wheel 7 having a central depending boss or hub 9 seating upon the yoke 3 to space the wheel properly thereabove. The wheel 7 carries the lamp, as will presently appear.

The wheel 7 is provided with diametrically opposite upstanding ears 10 to which are pivoted the lower ears of a lamp bracket 11 carrying the lamp or headlight 12 which is disposed in front of the radiator, the bracket 11 being adapted to be swung to various angles so that the light will be directed at the desired angle. Attached to the bracket 11 is a rearwardly projecting tail piece 13 having a rod or bolt 14 engaged within its rear end, nuts 15 being threaded upon the rod 14 and bearing against the opposite sides of the tail piece 13. The lower terminal of the rod 14 projects through an elongated slot 16 of an upwardly offset portion 17 of a strip 18 secured upon the wheel 7 and projecting rearwardly. Nuts 19 are threaded upon the rod 14 and bear upon the upper and lower sides of the offset portion 17. By adjusting the nuts 19, the tail piece 13 can be adjusted upwardly and downwardly, for changing the angular position of the bracket 11.

In order that the wheel 7 can be rotated about a vertical axis to swing the lamp 12, the lower face of the wheel 7 is provided with an arcuate series of gear teeth or a gear segment 20 meshing with a bevel pinion 21 rotatably mounted upon the yoke 3 adjacent the rod 1. A sleeve or collar 22 is slipped upon the yoke 3 to hold the pinion 21 against the shoulder 22ª of the yoke 3, the bolt 4 engaging through the collar 22. The lower end of the bolt 4 has a hook 24 provided with a U-shaped guide 25 through which a transverse rack bar 26 is slidable, said rack bar having teeth meshing with the bottom of the pinion 21, while the top of said pinion meshes with the gear segment 20 of the wheel 7. Nuts 23 are threaded upon the bolt 4 above the sleeve 22 and below the rod 1 for holding the respective parts assembled rigidly, and this will also hold the guide 25 in place so that it holds the rack bar 26 in proper relation with the pinion 21. The terminals of the rack bar 26 are slidable through guides 27 having upwardly projecting bosses 28 fitted from below into the side members or channels of the frame F adjacent the bolts 2, and securing bolts 29 are engaged downwardly through said channels and threadedly engage the bosses 28 for securing the guides 27 firmly in place. When the rack bar 26 is reciprocated transversely, this imparts rotary movement to the pinion 21, and said pinion in turn imparts rotary movement to the wheel 7 for swinging the lamp in a horizontal plane.

The rack bar 26 is operatively connected with the steering gear and to this end, a sleeve 30 is mounted for swinging movement upon the bar 26 between a pair of collars 31 secured thereon by means of set screws 32, and a downwardly projecting arm 33 has its upper end attached to the sleeve 30. A rearwardly projecting arm 34 has its forward end pivotally connected, as at 35, to the lower end of the arm 33, and the rear end of the arm 34 has a sleeve 35 swingably mounted upon a transverse rod 36, a pair of adjustable collars 37 being mounted upon the rod 36 to hold the sleeve 35 therebetween. By adjusting the collars 31 and 37, the position of the arms 33—34 can be adjusted.

The rod 36 is attached to the transverse steering rod 38 connecting the knuckles 39 of the steering wheels as is common in motor vehicles. The clamps for attaching the rod 36 to the rod 38 each embody a pair of clamping blocks 39 receiving the rod 36 therebetween, one of said blocks 39 engaging the rod 38, and a U-shaped clip or bolt 5 straddles the rod 38 and extends through the blocks 39, nuts 41 being threaded upon the limbs of the bolt 40 to clamp the rod 36 between the blocks 39 and the rod 38 between one block 39 and the bend of the bolt 40. By means of the clamps, the rod 37 can be readily attached to the steering rod 38 and at a suitable position relative thereto.

In operation, supposing the attachment to be properly applied to the automobile, when the steering wheels are angled in one direction, the rod 36 will be moved toward one side with the rod 38, and the arms 33—34 will be moved correspondingly so as to move the rack bar 26 in the same direction as the steering rod 38. This will rotate the pinion 21 which rotates the wheel 7 for swinging the lamp so that the light will shine toward the side toward which the vehicle is steered. When the vehicle is turned to the opposite side, the lamp is turned likewise. In this manner, the light is always directed in the path to be traversed by the vehicle which is particularly desirable when traveling upon tortuous roads. It is to be noted that the arms 33—34 can swing in a vertical plane to allow the rod 38 and frame F to move upwardly and downwardly relative to one another, without impairing the operation of the present mechanism, since the arms 33—34 will always move the rack bar 26 with the rod 36.

Having thus described the invention, what is claimed as new is:

1. In a device of the character described, a pair of transverse rods, a longitudinal yoke having one end attached to one of said rods, a securing element attaching the other end of the yoke to the other rod, said securing element having a lower hook provided with a guide, a rotatable lamp carrying member mounted upon said yoke and having a gear segment, a pinion rotatable on said yoke and meshing with said segment, a transverse rack bar slidable in said guide and meshing with the bottom of said pinion, and means for operatively connecting said bar with the steering gear of a vehicle.

2. In a device of the character described, a longitudinal yoke, a hook attached thereto and depending therefrom and provided in its end with a guide, a rotatable lamp carrying member mounted upon said yoke and having a lower gear segment, a pinion rotatable on said yoke and meshing with said segment, a transverse rack bar slidable in said guide and meshing with the bottom of said pinion, and means for operatively connecting said bar with the steering gear of a vehicle.

In testimony that I claim the foregoing as my own, I have hereto affixed my signature in the presence of two witnesses.

FRANK KEELIN.

Witnesses:
    GEO. W. REBER,
    FRANK HAMNER.

Copies of this patent may be obtained for five cents each, by addressing the "Commissioner of Patents, Washington, D. C."